United States Patent [19]

Müller

[11] 4,088,577
[45] May 9, 1978

[54] METHOD FOR FLUSHING PIGMENTS IN THE FORM OF WATER CONTAINING CAKES

[75] Inventor: Helmut Müller, Mannheim, Germany

[73] Assignee: Firma Draiswerke GmbH, Mannheim-Waldorf, Germany

[21] Appl. No.: 598,232

[22] Filed: Jul. 23, 1975

[30] Foreign Application Priority Data

Aug. 3, 1974   Germany .............. 2437510

[51] Int. Cl.² .................................. B01D 43/00
[52] U.S. Cl. .................... 210/67; 210/360 R; 210/523; 210/540; 210/532 R; 233/7; 366/139; 366/149; 366/313
[58] Field of Search ............ 210/40, 67, 68, 83, 210/360 R, 78, 173, 174, 523, 532, 538, 540; 259/DIG. 38, 11, 9, 10, 25, 26, 45, 46, 109, 110, 14–16; 106/309, 262; 233/3, 7

[56] References Cited

U.S. PATENT DOCUMENTS

| 609,936 | 8/1898 | Ismay | 106/262 |
|---|---|---|---|
| 1,119,960 | 12/1914 | Hochstetter | 106/262 X |
| 1,590,067 | 6/1926 | Acheson | 106/262 |
| 2,219,395 | 10/1940 | Moilliet | 106/262 |
| 2,239,741 | 4/1941 | Schroder | 15/38 X |
| 2,379,678 | 7/1945 | Brown et al. | 106/262 |
| 2,644,759 | 7/1953 | Schroeder | 106/262 X |
| 2,874,062 | 2/1959 | Kebrich | 106/262 |
| 2,907,670 | 10/1959 | Katz | 106/262 X |
| 3,081,473 | 3/1963 | Wells | 15/38 X |
| 3,162,428 | 12/1964 | Lödige et al. | 259/9 |
| 3,528,365 | 9/1970 | List | 210/67 X |

FOREIGN PATENT DOCUMENTS

| 390,812 | 2/1924 | Germany. |
|---|---|---|
| 979,236 | 1/1965 | United Kingdom. |

OTHER PUBLICATIONS

"Flushed Colors and Printing Inks", An Article In The American Ink Maker, May 1961, pp. 79, 80, 118.
Roemp, Chemielexicon, 5th Edition, 1962, Column 1716.

*Primary Examiner*—Frank W. Lutter
*Assistant Examiner*—Frank Sever
*Attorney, Agent, or Firm*—Browdy and Neimark

[57] ABSTRACT

A method for flushing pigments in the form of water-containing cakes by replacing the water with an organic vehicle using an apparatus comprising a horizontal mixing cylinder having a coaxial mixing shaft, and inlet opening and a lower outlet opening. The shaft has mixing tools thereon. The pigment cake and vehicle are added to the container and the shaft is driven at a rate such that the formed pigment-vehicle paste forms on and is wound up on the shaft, leaving the water in the lower part of the container for easy removal through the lower opening.

9 Claims, 2 Drawing Figures

METHOD FOR FLUSHING PIGMENTS IN THE FORM OF WATER CONTAINING CAKES

FIELD OF THE INVENTION

The present invention concerns a method for flushing pigments in the form of cakes containing water, wherein an organic vehicle replaces the water at the same time that the latter is largely removed.

BACKGROUND OF THE INVENTION

In the so-called flushing method, the pigments which (regularly) occur in the aqueous phase and are given a low water content in filter presses (said pigments having the form of so-called cakes after filtering, said cakes still containing up to 75-80% water) are kneaded in large kneading machines with an organic vehicle, wherein 80-85% of the water contained in the cake is removed and the organic phase, namely the vehicle, replaces the water. The removal of the residual water is accomplished under heating in vacuum. Organophilic pigments, i.e. those which are easily dispersed by organic liquids, are particularly suitable for this method; in the case of hydrophilic pigments, it is necessary to use flushing aids (cf. Roempp, Chemielexikon, Fifth Edition, 1962, Column 1716 and U.S. Pat. No. 609,936 and German Pat. No. 390,812).

It is also known to obtain by drying the pigments which occur with very small particle sizes when precipitated in the aqueous phase. However, this involves a considerable grain enlargement, which must be eliminated once again by subsequent very costly dry milling or milling of the pigment powder in the vehicle, for example in stirring mills, and in many cases the process is not complete.

For this reason, the flushing method has a considerable advantage since the small grain size of the individual pigment particles is retained when the pigment is precipitated.

In the familiar flushing method, kneading machines with a double kneading trough with kneading tools rotating in them are used. The pigment cakes are fed into the kneading machine. The vehicle is then added with the machine running, and the phase change is carried out by intensive kneading; after a certain treatment time the water is largely separated from the cake, as the vehicle is deposited on the pigment. The separated water collects in the upper part of the trough of the kneading machine and is either removed therefrom by tipping the kneading machine until water can run off, or by sucking off the water from the top. In order to tip out the water, a greater structural expenditure is required for the usual size kneading machine; on the other hand, there will always be a danger of pouring off a portion of the oily, therefore viscous, pigment-vehicle paste together with the water. This danger cannot be eliminated even when the water is sucked off, so that in both methods the separated water is not eliminated completely, in order to keep down the loss of pigment and paste.

For this reason, a relatively large amount of water has to be removed by subsequent heat and/or vacuum treatment.

SUMMARY OF THE INVENTION

The purpose of the invention is to develop a method of the type described hereinabove by means of which the water separated from the cake can be removed in a simpler and more complete fashion.

This task is solved according to the invention by using a discontinuously operating mixing machine consisting of a horizontally mounted cylindrical mixing container provided with an upper filling opening and a lower closable outlet opening, having a mixing shaft likewise mounted horizontally, driven so as to rotate, and provided with mixing tools projecting from it, wherein the mixing shaft is driven at a speed such that the pigment-vehicle-paste which is viscous and forms upon it is wound up on the mixing shaft.

The vehicle-pigment-paste is viscous and results from the processing of the water-containing cake on the one hand and the vehicle on the other, thus having a consistency which is referred to in the literature as oily. The paste is picked up by the mixer and wound up on the mixing shaft, while the separated water collects in the vicinity of the lower wall of the mixing container, in other words, in the gap between the mixing container wall and the wound-up paste. The development of this winding effect is extremely surprising, since the use of mixers that can be used as pushing mixers or helical mixers would lead one to expect the formation of an emulsion composed of water, vehicle and pigment. Preferably this separated water is drained off at the end of the flushing process through the lower outlet opening with the mixing shaft in motion, since in this fashion the separation of the paste from the mixing shaft can be delayed at least until all of the separated water has flowed out of the mixing container. Then the mixing shaft is stopped so that the paste can flow down onto the bottom of the mixing container, or may be driven at such a high speed that the paste is flung off the mixing shaft.

The duration of the actual flushing process, i.e. the duration of the phase change, is reduced by the measures according to the invention by ⅓ in comparison to known kneading machines.

In order for the paste composed of vehicle and pigment to wind up smoothly upon the mixing shaft, it is advantageous to have the mixing container, prior to the start of the flushing process, filled with pigment cake and vehicle at least up to the level of the mixing shaft, so that advantageously a degree of filling of the mixing container of 50-75% at the start of the flushing process is chosen.

During the flushing process, in other words during the phase change, the mixing shaft should be driven at a subcritical speed, preferably with $n = 0.6$ to $0.7$ $n_{crit}$ in order on the one hand to ensure sufficient kneading and on the other hand to effect a sufficiently rapid phase change, as well as to prevent the paste from being flung off the mixing shaft again. The optimum speed depends on the viscosity of the paste in question.

In a mixing machine of the type described for this purpose, it is also possible in a particularly simple fashion to carry out the vacuum and/or heat treatment directly in the mixing container following the draining off of the separated water, since such a mixing machine as a rule can be easily made in closed form.

Further advantages and features of the invention will be seen from the description of an embodiment with reference to the drawings.

DETAILED DESCRIPTION OF PREFERRED EMBODIMENT

Figure 1:
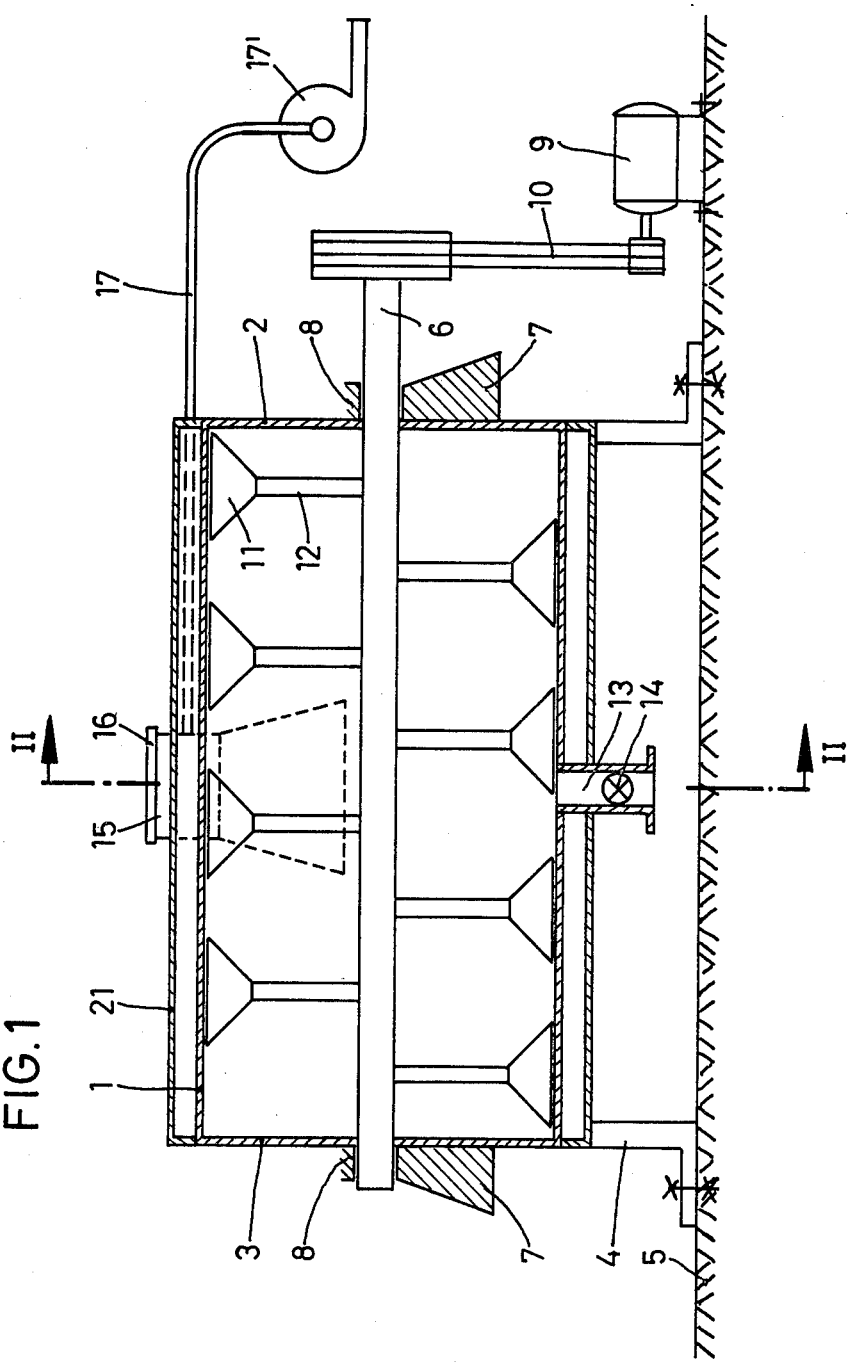
FIG. 1 shows a lengthwise section through a mixing machine used for flushing.

The mixing machine shown in the drawing consists essentially of a horizontally mounted cylindrical mixing container 1, closed at its end by end walls 2 and 3. This mixing container rests on a foundation 5 and is supported by a machine frame 4. Mixing container 1 has concentrically (therefore, also horizontally) mounted in it a mixing shaft 6, which is rotatably mounted in bearings 8 supported on bearing blocks 7. The mixing shaft is driven by a motor 9 through a pulley drive 10. It is provided over its entire length in mixing container 1 with radially projecting mixing tools 11, which on the one hand sweep the entire length of the mixing container wall by virtue of their projections in a plane which passes through the axis of the mixing shaft, and on the other hand come as close to the inside walls of the mixing container as is possible for structural reasons. In particular, this ensures a good kneading effect and also ensures that the material adhering to the walls of the container will be wiped away. These mixing tools may be obliquely mounted plates. The mixing tools are fastened to mixing shaft 6 by corresponding support rods 12.

At the lowest point in mixing container 1 is an outlet stub 13 with a shutoff valve 14. On the top of mixing container 1 is a filling stub 15 which enters the mixing container at a tangent, said filling stub being capable of being sealed in an airtight fashion by a cover 16. A vacuum suction line 17 empties into filling stub 15, said vacuum suction line being capable of being connected if desired during operation to a vacuum suction blower 17'.

Figure 2:
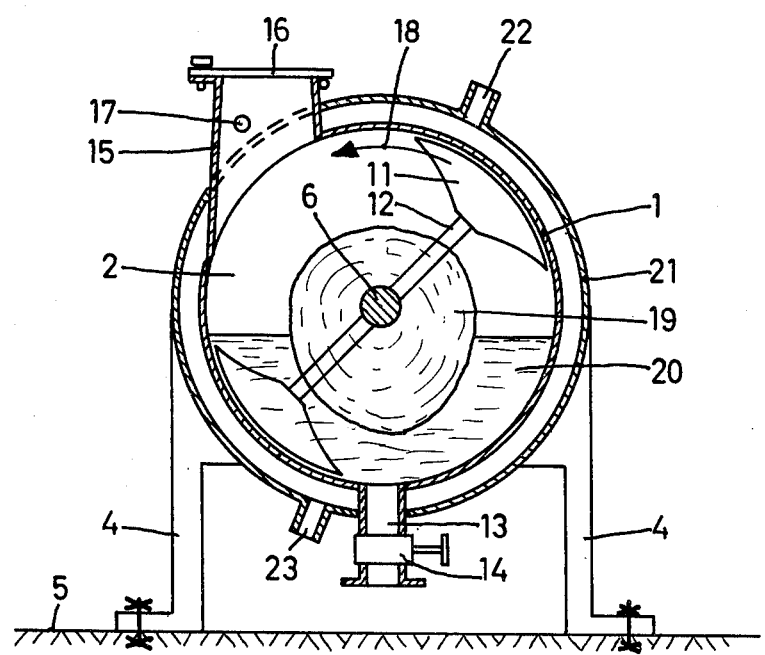
FIG. 2 is a cross-section through the mixing machine along line II—II in FIG. 1.

Mixing shaft 6 and hence mixing tool 11 is driven in the usual fashion (as seen from motor 9) in a clockwise direction, i.e. in the drawing as shown in FIG. 2 in a counterclockwise direction, in the direction of rotation as indicated by arrow 18.

The method according to the invention in this mixing machine proceeds as follows:

Pigment cakes containing water and organic vehicle in a predetermined ratio are added through filling stub 15 with cover 16 open and shutoff valve 14 closed; they are added in such an amount that mixing shaft 6 is at least covered. Then, or even during the addition of the above-mentioned materials, with cover 16 closed, mixer 6, 11 is driven. During the treatment that now takes place, vehicle is applied to the pigment and water is removed in the same amount. The viscous paste composed of pigment and vehicle moves toward mixing shaft 6, and a sort of winding effect occurs, i.e., an approximately cylindrical body 19 composed of pigment-vehicle paste forms on mixing shaft 6, said body not being rotationally symmetrical with respect to mixing shaft 6 owing to its viscous consistency, but hanging downward as shown in FIG. 2.

The water separated from the cake collects in the space 20 between this body 19 composed of vehicle-pigment paste and the inside wall of the mixing container 1, wherein the water level naturally drops as the accumulation of the vehicle-pigment paste on body 19 increases.

At the end of the flushing process, in other words, when practically all of the pigment has gone over to the viscous vehicle-pigment phase with simultaneous accumulation on body 19, with mixer 6, 11 still running, shutoff valve 14 is opened and the separated water which is in space 20 is drained off. Then valve 14 is closed again and mixer 6, 11 is stopped, so that the vehicle-pigment paste can flow off the mixing shaft, or the mixing shaft is driven at a considerably increased speed in order to fling off the paste.

Then the inside wall of the mixing container is heated, which can be accomplished most simply by conducting a heat carrier such as hot water, hot oil or steam in a circuit through a double jacket 21 which surrounds the mixing container 1 via an inlet opening and an outlet opening 22 and 23. In order to be able to accomplish the final drying at temperatures as low as possible, mixing container 1 is simultaneously largely evacuated through vacuum suction line 17. During this final drying, the vehicle-pigment paste, which still contains residual water components, is spun at an extraordinarily intensive rate by the mixing tools against the inside of the mixing container, so that this final drying process is also carried out extraordinarily rapidly.

EXAMPLE 60 kg of cake with phthalocyanin blue as the pigment, with a water content of 70%, and 15 kg of linseed oil were treated in a mixer with a 100-liter volume and an inside diameter of 0.5 m. The phase change occurred within 15 minutes. The speed of the mixer was $n = 40$ rpm. Then the pigment-vehicle paste was dried for 2½ hours at 65° C paste temperature and a speed of 150 rpm, with simultaneous exposure to a vacuum.

The critical rpm is defined as $n_{crit} = 42.3/\sqrt{D}$, where D is the diameter of the mixer in meters. This means that the rpm, $n$, during the phase change is $n = 0.66 n_{crit}$ and the speed during the drying process is $n = 2.5 n_{crit}$.

The critical rpm $n_{crit}$ (measured in revolutions per minute) develops when $(D/2) \cdot w^2 = g$, where $w$ is the angular velocity of the mixer and $g$ is the acceleration due to gravity.

It will be obvious to those skilled in the art that various changes may be made without departing from the scope of the invention and the invention is not to be considered limited to what is shown in the drawings and described in the specification.

What is claimed is:

1. A method for flushing pigments in the form of a water-containing pigment cake by replacing the water with a suitable organic vehicle, comprising the steps of:

feeding the pigment cake and the organic vehicle into a horizontally mounted mixing cylinder provided with an inlet opening and a lower closable outlet opening, said cylinder having a single coaxial mixing shaft therein, said shaft being provided with a plurality of projecting mixing tools, each of said mixing tools being connected to said shaft by means of a support rod which supports said mixing tool in the vicinity of the inside wall of said mixing cylinder;

driving said mixing shaft at a speed such that substantially all of a mass of viscous pigment-vehicle paste formed from said vehicle and the pigment of said cake, within said cylinder, forms on and is wound up on said mixing shaft, thereby causing said water to be separated from said mass, said speed being a subcritical speed, wherein critical speed is calculated in rpm as 42.3 divided by the square root of the diameter of the mixing cylinder in meters; and draining the separated water which collects in the space between the wound-up pigment-vehicle paste and the inside wall of said mixing cylinder through said lower outlet opening, during said driving step.

2. A method in accordance with claim 1 wherein said driving step comprises driving said mixing shaft at 0.6 – 0.7 times critical speed.

3. A method in accordance with claim 1 wherein said feeding step comprises filling said container prior to said driving step at least up to the level of said mixing shaft with pigment cake and vehicle.

4. A method in accordance with claim 3 wherein said feeding step comprises filling said container prior to said driving step 50 to 75% full with pigment cake and vehicle.

5. A method in accordance with claim 1 wherein said mixing tools wipe the entire length of the mixing cylinder inside wall.

6. A method in accordance with claim 1, wherein said mixing tools extend close to the inside wall of said mixing cylinder.

7. A method in accordance with claim 1, further including the step of heating said mixing cylinder.

8. A method in accordance with claim 1, further including the step of forming a vacuum within said mixing cylinder.

9. A method in accordance with claim 1, further including, after said draining step, driving said shaft at a speed sufficiently great so as to cause the paste to be flung from the shaft to the inner wall of the mixing container.

* * * * *